| GAIN SETTING | BGO3 | BGO2 | BGO1 | ADV. PULSES |
|---|---|---|---|---|
| 128 | 0 | 0 | 0 | CLEAR |
| 64 | 0 | 0 | 1 | AP1 |
| 32 | 0 | 1 | 0 | AP2 |
| 16 | 0 | 1 | 1 | AP3 |
| 8 | 1 | 0 | 0 | |
| 4 | 1 | 0 | 1 | |
| 2 | 1 | 1 | 0 | |
| 1 | 1 | 1 | 1 | |

INVENTOR.
PETER A. GODINEZ
BY Christie, Parker & Hale
ATTORNEYS.

April 2, 1968 P. A. GODINEZ 3,376,557

DIGITAL DATA ACQUISITION SYSTEM WITH AMPLIFIERS HAVING AUTOMATIC BINARY GAIN CONTROL CIRCUITS

Filed May 10, 1965 4 Sheets-Sheet 2

INVENTOR
PETER A. GODINEZ
BY Christie, Parker & Hale
ATTORNEYS.

April 2, 1968 P. A. GODINEZ 3,376,557

DIGITAL DATA ACQUISITION SYSTEM WITH AMPLIFIERS HAVING AUTOMATIC BINARY GAIN CONTROL CIRCUITS

Filed May 10, 1965 4 Sheets-Sheet 3

INVENTOR
PETER A. GODINEZ
BY Christie, Parker & Hale
ATTORNEYS.

| | | | | | | | | | | | | |
|---|---|---|---|---|---|---|---|---|---|---|---|---|
| TRACK 1 | ± | $2^4$ | $2^9$ | X | X | X | | ± | $2^4$ | $2^9$ | |
| TRACK 2 | $2^0$ | $2^5$ | $2^{10}$ | X | X | X | | $2^0$ | $2^5$ | $2^{10}$ | |
| TRACK 3 | $2^1$ | $2^6$ | $2^{11}$ | X | X | X | | $2^1$ | $2^6$ | $2^{11}$ | |
| TRACK 4 | $2^2$ | $2^7$ | BGD 1 | X | X | X | | $2^2$ | $2^7$ | BGD 1 | |
| TRACK 5 | $2^3$ | $2^8$ | BGD 2 | X | X | X | | $2^3$ | $2^8$ | BGD 2 | |
| TRACK 6 | $ID_1$ | $ID_2$ | BGD 3 | X | X | X | | $ID_1$ | $ID_2$ | BGD 3 | |
| TRACK 7 | P | P | P | X | X | X | | P | P | P | |

|←CHANNEL #1→|←CHANNEL #2→|- - - -|←CHANNEL #1→|

INVENTOR.
PETER A. GODINEZ
BY
Christie, Parker & Hale
ATTORNEYS.

3,376,557

DIGITAL DATA ACQUISITION SYSTEM WITH AMPLIFIERS HAVING AUTOMATIC BINARY GAIN CONTROL CIRCUITS

Peter A. Godinez, West Covina, Calif., assignor to Leach Corporation, San Marino, Calif., a corporation of Delaware Filed May 10, 1965, Ser. No. 454,558
15 Claims. (Cl. 340—172.5)

ABSTRACT OF THE DISCLOSURE

An amplifier has a plurality of gain determining circuits connected in parallel. The amplifier gain values established by the gain determining circuits are binary weighted. Under the control of a counter, the gain determining circuits are individually actuated so the amplifier gain decreases in value in binary weighted steps until the amplifier output level drops below a predetermined value, which indicates that it is within the most sensitive range of an analog-to-digital converter. A digital signal representing the state of the binary counter is combined as a scale factor with the converted digital signal representing the amplifier output. In a multichannel system, the described amplifier is provided for each channel. Under the control of a clock source, the amplifier outputs are multiplexed before application to the analog-to-digital converter and the gain of each amplifier is set in the interval between samples. For the purpose of monitoring the operation, apparatus is also provided for converting the combined signal back to an analog signal which is applied to a visual display device.

This invention relates in general to data handling systems and more particularly relates to a new and improved analog signal amplifier and its method of employment in digital data systems.

Present day data processing systems cover a wide gamut of operations which require precise signal-handling ability. Because of today's increased types of data that must be processed automatically, numerous categories of data processing systems are being employed. One particular type of data that has, prior to the time of this invention, presented a considerable problem in scientific analysis is analog data of waveforms having complex shapes and which commence at a high amplitude and gradually decrease to a very low amplitude. This type of signal is generally present in studies involving the scientific analysis of the earth and the ocean.

To pick a typical example of the foregoing sciences, reference is made, merely by way of example, to the science of processing seismic data, that is often employed in oil well exploration. It is customary in obtaining oil well exploration data to create a seismic disturbance in some manner, such as detonating an explosive charge or creating a shock disturbance, and thereafter to recover and record the shock waves after they have been recovered from various strata levels of the earth. Inherent in this technique which normally employs some form of transducer, such as a seismometer as a signal recovery unit, is an analog waveform that is relatively large in amplitude a moment after the seismic disturbance and which drops off to a very small amplitude signal several seconds after that disturbance. Experience has shown that very often a considerable amount of information of prime concern is that information which is in the very low amplitude region of the overall analog waveform envelope.

It has been common practice for more than a decade to process the signals recovered from a plurality of seismometers by pulse code modulated techniques. Such techniques include amplifiers, a multiplexing unit, an analog-to-digital converter, and a computer which is appropriately programmed to perform complex mathematical operations on such data thus eliminating many man-hours of slow, tedious, complex analog waveform analysis by persons skilled in seismic exploration work. In such systems numerous prior art amplifier techniques have been utilized in an attempt to boost the small amplitude signals to a level that can satisfactorily be handled by digital techniques. These prior art approaches include automatic gain control amplifiers, and programmed gain amplifiers, to mention just two typical approaches. These approaches and other prior art approaches in general have proved unsatisfactory for reasons to be discussed in detail hereafter.

In the art of seismic wave form analysis, the information is of low frequency, normally with an upper frequency range of approximately 125 cycles. Automatic gain amplifiers for each seismometer information channel have failed to provide the necessary amplification for this low frequency type of signal because these prior art automatic gain amplifiers are not sufficiently sensitive at such low frequencies to faithfully amplify and reproduce the wide range of amplitude presented by such analog signals. This sensitivity and reproduction shortcoming is particularly true for low amplitude signals, because an AGC amplifier is a slow, continuously operating amplifier which by its very nature must have a frequency response less than the lowest frequency of the signal to be monitored in order to function satisfactorily. If the frequency response of the AGC amplifier is increased, as some prior art approaches have sought to do, the AGC amplifier system tends to mask the incoming signal with the result that either the information is destroyed or considerable distortion is present in the amplifier output and is thus useless to the system.

Another typical prior art approach referred to is the programmed gain amplifier system. As mentioned above, the average envelope of an analog waveform in seismic exploration starts at a high amplitude level and decreases asymptotically. This average curve may thus be compensated for, to a limited degree of success, by choosing a programmed gain function for the amplifier which is roughly the inverse of this average envelope curve. This approach, because it is based entirely on a hypothetical average of what the envelope of the average analog waveform will assume, has not proved satisfactory in many instances. Various factors such as the density of the earth, the earth's water content, and numerous other complex variables produce analog waveform envelopes entirely different from this hypothetical average, and in these instances the programmed gain amplifier does not operate satisfactorily because it introduces distortion into the data samples.

These prior art approaches have in the past been combined with state-of-the-art analog-to-digital converters, but prior to this invention none of the amplifiers significantly increased the over-all dynamic range well beyond that of the analog-to-digital converter. The dynamic range for a state-of-the-art analog-to-digital converter is limited by present quantizing operations to code in binary form a plus or minus 1 volt signal amplitude to a plus or minus 50 micro-volt signal in amplitude. Any input information which is below the 50 micro-volt level has been lost to prior art systems which are not sensitive enough to recover this low amplitude information.

The foregoing disadvantages of the prior art are avoided by the principles of this invention which can greatly increase the sensitivity of a digital processing system by a new and novel method and apparatus to such an extent that a workable range of plus or minus one volt to plus or minus 1 micro-volt is possible.

The dynamic range of a digital system is increased in accordance with the principles of this invention by a data handling method including the steps of applying an analog signal of varying amplitude to a variable gain amplifier, reducing the gain of the amplifier in selectively available binary weighted values until the amplified analog output is properly scaled for an analog-to-digital converter, applying the amplified analog signal sample to an analog-to-digital converter, generating binary coded signals representing the binary gain setting and the binary value of the data sample, and combining these signals into a single binary word for a utilization circuit.

An amplifier for each analog signal source, which may be a geophone, is provided with a gain control circuit that has selectively available binary weighted gain control settings. A time control device is provided which defines successive, repetitive sampling intervals for the analog data inputs in which one recurring interval is assigned to each of the analog data sources and this time control device additionally defines an equal number of successive, repetitive gain setting intervals that allow a multiple gain setting circuit automatically to establish the amount of amplification required in the amplifier in order to produce a properly scaled signal at the multiplexer just prior in time to the data sampling interval for that particular channel. Both the multiple gain setting represented in binary code, and the sampled information represented in binary code are subsequently combined as a single binary signal by an output circuit that is common to the gain setting circuit and the analog-to-digital converter circuit. These two binary coded values represent, in one particular system example described in detail hereinafter, an increase in the dynamic range of a pulse code modulation system from present limitations of 84 decibels to a dynamic range of 120 decibels. This specified increase is not to be taken as limiting as the principles of this invention provide, in general, an ncrease in resolution for analog inputs equal to $2^n$, where $n$ is the number of distinct multiple binary gain settings for the input amplifier gain control circuit.

The foregoing principles and advantages of this invention may be more fully appreciated by reference to the accompanying drawing in which.

Figures 1, 2A:
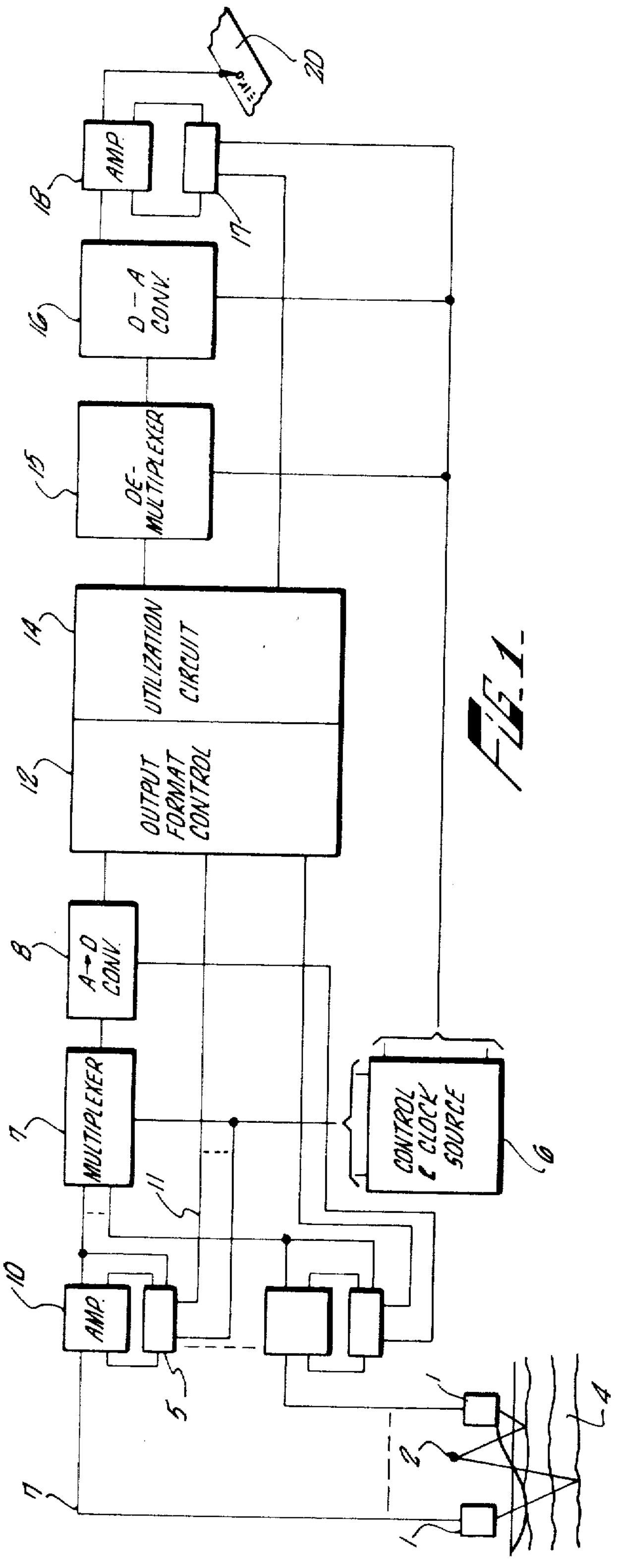
FIG. 1 is a block diagram of a pulse code modulation system employing binary gain amplifiers in accordance with the principles of this invention.
FIG. 2A is a chart useful in illustrating some of the typical multiple gain settings and binary codes for the circuit of FIG. 2.

FIG. 1 depicts a block diagram of data acquisition system utilizing pulse code modulation techniques for the recovery and processing of analog data. The principles of this invention are not limited to the seismic exploration of oil wells, a typical use of the system of FIG. 1, but find equal value in numerous other data processing systems, such as the science of oceanography, to name just one typical example. In FIG. 1 a plurality of shock responsive transducers or geophones 1 are shown receiving shock signals which result from the creation of a seismic disturbance. This disturbance may be caused by exploding a charge 2. Shock signals so produced are reflected from strata levels 4 beneath the earth's surface, and these reflected signals are recovered by geophones 1. Each signal picked up by an individual geophone is different from all signals picked up by the remaining geophones, and thus require a different level of amplification prior to sampling. It is for this reason that a plurality of amplifiers 10 equal in number to the geophones 1 are provided. Each amplifier 10, in a manner to be described in detail hereinafter, includes a gain control circuit 5 in order to properly amplify the recovered information.

These gain control circuits 5 have selectively available binary weighted gain control settings which are connected automatically and in sequence across the gain control terminals of amplifier 10 by commands from the control circuit 6. Such sequential connections are achieved during a discrete gain setting interval which occurs prior to the data sampling interval for each one of the individual analog channels including a geophone 1, a connecting lead 7, and an amplifier 10.

Timing control source 6 controls the successive, repetitive sampling intervals for a multiplexer circuit 7, which circuit obtains a discrete sample repetitively from each one of the amplified analog input signals. These individual repetitive samples from all of the analog channels, once they are time divided by the multiplexing circuit 7, are applied in proper sequence to an analog-to-digital converter circuit 8 which is also controlled in a well known manner by clock source 6.

Analog-to-digital converters such as 8 in FIG. 1 are well known in the art. Such converters generally employ a quantizing operation which is described in detail in an article by William M. Goodall in the July 1947 issue of the Bell System Technical Journal, vol. XXVI, No. 3, pages 395 through 409 and reference may be made to this publication if such details are deemed necessary.

In general, however, a quantizing operation of the type mentioned above involves storing an analog sample for a comparison operation between the stored signal, and a series of distinct current values which are determined by numerous distinct and different valued current limiting circuits. These different current values are normally obtained by different valued resistors. In order to accurately quantize these analog signals it is necessary that the current values be within extremely close tolerances. For example, in the standard state-of-the-art analog-to-digital converters which provide 14 binary bits (84 decibels) the various resistor values that establish comparison currents for quantizing must match precisely determined mathematical standards within .001 percent. The development of an analog-to-digital converter which would provide more than 14 bits in the digital output would require resistors having matching tolerances far more stringent than .001 percent. Such percentages, although hypothetically possible, are in fact not available today and very likely will not be readily available at economically feasible rates in the distant future.

By employing the method and binary gain amplifiers of this invention, it is possible to develop a PCM system with a binary output of 21 bits, or a dynamic range of 124 decibels, thus increasing the sensitivity of the system by a ratio of 100 to 1 as compared to prior art PCM systems for this given example. This increase is provided by a minimum addition of circuitry which is simple and efficient in operation. For example, with reference to FIG. 1, the foregoing increase in sensitivity over prior art PCM systems is provided by the addition of the binary gain controlling circuits 5 which are connected prior to multiplexer 7 and the analog-to-digital converter 8. Thus, if the analog-to-digital converter 8 in FIG. 1 is capable of delivering a 14 bit binary output ($2^{14}$) and the gain control circuit 5 is utilized, the dynamic range is expanded by 7 more binary bits ($2^7$) thus providing a total binary range of 21 binary bits ($2^{21}$).

Gain control circuit 5 selects from the various binary weighted gain settings available the lowest order binary setting that will deliver an analog signal which, when amplified, reaches a proper scale value for the analog-to-digital converter 8. This binary setting, when chosen, is reflected in a binary character that is automatically generated by the gain control circuit 5 and is applied at the appropriate time directly through lead 11 to a tape format control circuit 12.

This tape format circuit 12 is well known in the art and in its simplest form may comprise a programmed gating network controlled by clock source 6. Format circuit 12 applies the binary gain setting signal to the utilization circuit 14, and, in addition, applies a binary signal generated by converter 8 to utilization circuit 14. This second binary signal is representative of the analog sample obtained from geophone 1 by the operation of multiplexer 7. These two signals are combined in one data block by format control 12, for presentation to utilization circuit 14. Utilization circuit 14 may advantageously be a magnetic storage medium of any of the well known types. For example, the storage medium may be the magnetic tape for a digital computer.

It is often necessary in the sciences of ocean and earth studies that an analog trace of the input signals, which have been recovered and are being digitally processed, be made available for a quick-look check by an expert who is skilled in the analysis of complex analog waves. This quick-look check may be provided in accordance with the principles of this invention by employing a de-multiplexing unit 15, a digital-to-analog converter 16 and an output amplifier 18 having a gain control circuit 17. The operation of both the output amplifier 18 and the input amplifier 10 and the associated gain control circuits 17 and 5 respectively are similar. Amplifier 18 and its gain control circuit 17 recombine the digital signal and the digital binary gain setting signal into an appropriate analog value, the amplitude of which is thereafter recorded as a continuous trace on a suitable visual display device 20. This visual display device may be a camera, an analog strip chart and stylus combination, or various other suitable display devices such as an oscilloscope.

Figure 2:
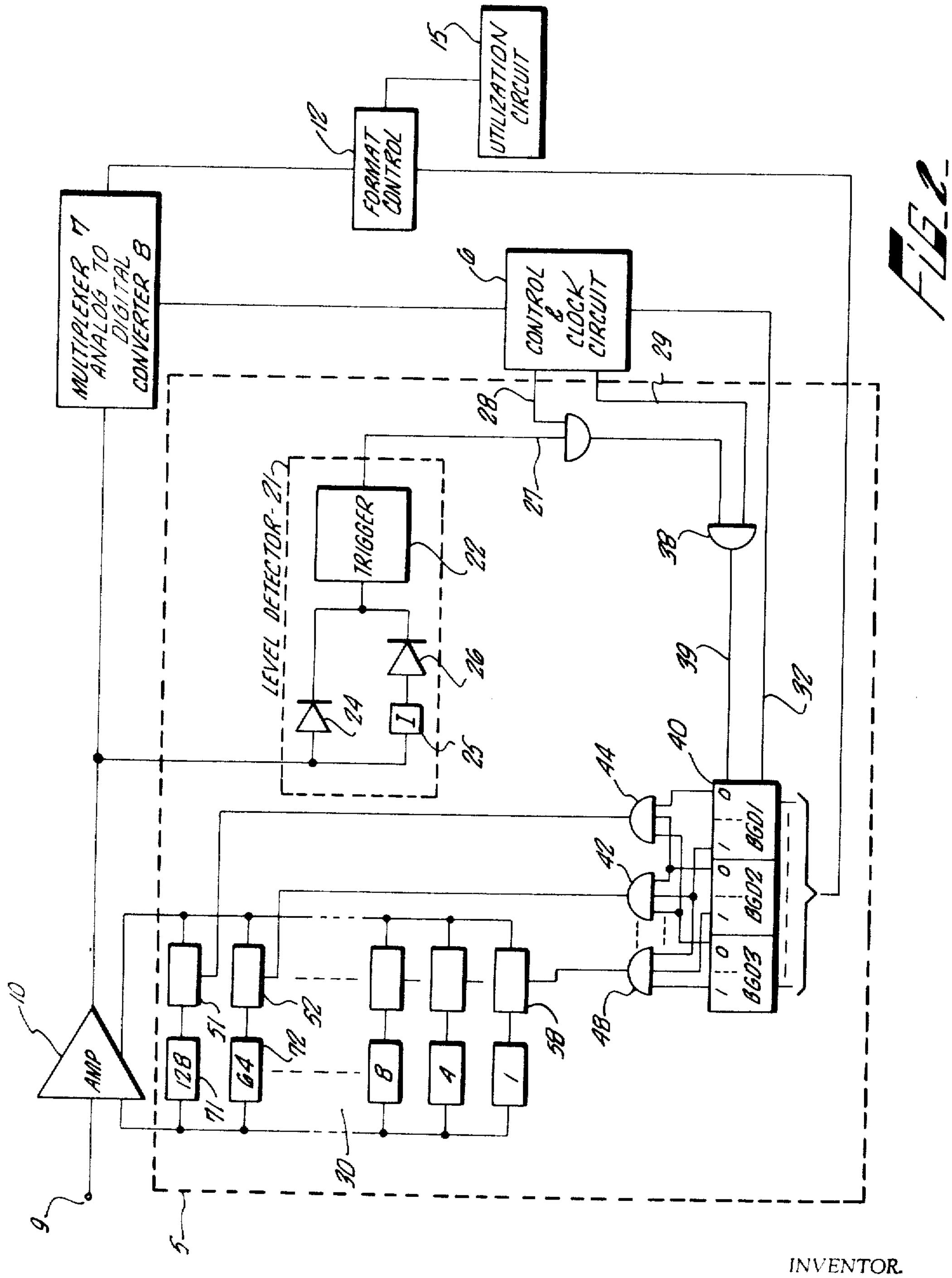
FIG. 2 is a combined circuit schematic and block diagram of a binary gain amplifier of this invention.

FIG. 2 discloses in block form the details of the amplifier and gain control circuit of this invention. The circuitry of FIG. 2 and the remaining figures utilize the same reference numbers as are used in FIG. 1.

Amplifier 10 and its gain control circuit 5 of FIG. 1 are repeated in detail form in FIG. 2. It should be understood by reference to FIG. 2 that this invention is not limited to a multiplexing unit or to the plurality of channels as such. It is equally applicable to a single analog channel which would be connected to the input terminal 9 of the amplifier 10. Thus a single analog signal sample can be reduced to a digital value by the circuitry of FIG. 2 and once reduced may be applied to a formal control circuit 14 and a utilization circuit 15.

In order to properly reduce the analog signals from the plurality of geophones 1 of FIG. 1, to their digital values the binary gain control circuit 5, of FIG. 2, is initially set at its highest order binary gain value by the clock control source 6 a specified time increment prior to the sampling time for that channel. Thereafter the gain control circuit 5 automatically during the time increment before sampling, sequentially reduces the gain of amplifier 10 in binary valued steps. This automatic sequence is controlled, in part, by signals delivered by the level detector circuit 21, so as to obtain a proper gain setting for amplifier 10. This proper setting may be an output signal of amplitude equal to one-half full scale, or other properly scaled signal, based on the amplitude range of the analog-to-digital converter 8.

For example, if a properly scaled value for the converter 8 is plus or minus one volt then the maximum amplifier output would be plus or minus one-half volt. A standard Schmitt trigger circuit 22 is connected in the level detector circuit 21 and this trigger circuit is set with a comparison voltage of the above-mentioned one-half volt. Diode 24 and the inverter-diode combinations 25, 26 are connected as shown so as to respond to either polarity input signals exceeding one-half volt. Such a signal from the output of amplifier 10 triggers circuit 22 and it, in turn, produces an output signal to an And gate 27.

This output signal from level detector 21 continues until the output signal of amplifier 10 drops below plus or minus one-half volt. In this latter event, the output signal from And gate 27 is removed by trigger circuit 22 which becomes non-conductive. As long as the amplified output is greater than one-half volt, an output indication is present at And gate 27. And gate 27 requires, of course, an additional input signal on lead 28. This additional signal on 28 is applied by control and clock source 6.

The timing requirements for clock source 6 are best described by detailed reference to FIGS. 3 and 4 hereinafter, however, in general this source 6 energizes And gate 27 for a time duration such that a train of clock pulses on lead 29 may be gated through the binary circuit 40 which circuit in turn generates the binary gain digits and simultaneously controls the various gain setting levels of ladder circuit 30. This operation automatically steps through the various possible binary gain values for amplifier 10 in a sequentially lower value binary order until the output monitored by level detector 21 is less than plus or minus one-half volt, at which time the proper gain level has been selected and simultaneously recorded in binary counter 40 where it is available for transmission by standard gating techniques to the format control circuit 12. Once the gain has been set, an analog sample amplified at that chosen binary gain setting is delivered to the converter circuit 8 and a digital signal is generated to accurately represent that sample. Both the sample and data signals in binary form are combined by format control 12 for presentation as a common signal to utilization circuit 14.

It is to be understood, of course, that FIG. 2 merely represents one amplifier 10 and its associated gain control circuit 5. This amplifier and control circuit may be assigned to analog input channel No. 1 shown in FIG. 3. In the example shown by FIG. 3, it is assumed that there are 20 different analog input signals which if multiplexed would require at least 20 different time slots. Accordingly, analog No. 1 is sampled by the multiplexer at time $T_1$, and at what is commonly referred to as one time frame later, channel 1 is again sampled at time $T_{21}$. During the time interval $T_1$ through $T_{21}$ each one of the analog input channels are sampled by the multiplexing unit 7 in a sequential, repetitive, successively increasing order. Thus at time $T_2$ input channel number 2 is sampled, at time $T_{10}$ input channel No. 10 is sampled, etc. Prior to the second sampling time slot $T_{21}$ for channel No. 1, gain control circuit 5 of FIG. 2 automatically sets amplifier 10 at its proper gain setting. In FIG. 2 the gain control circuits or ladder circuit 30 are shown in decreasing binary order as having values 128, 64, 32, 16, 8, 4, 2, 1. These settings represent 7 different binary gain settings plus a unity gain setting. Therefore, this gain selection may be made prior to the sampling for input channel 1 at time $T_{21}$ by utilizing at least eight time slots, one for each gain setting.

Figure 3:
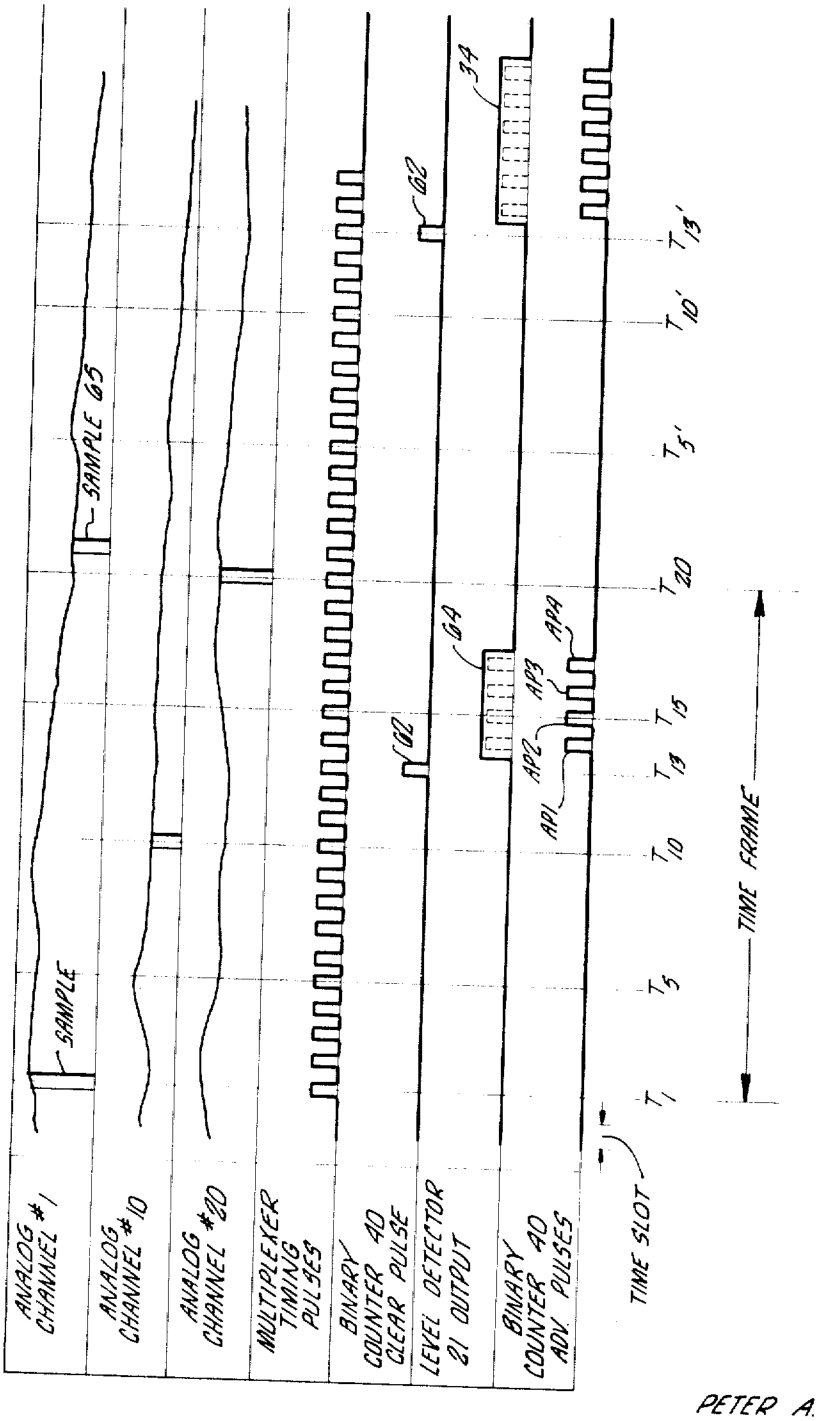
FIG. 3 is a waveform chart which is useful in illustrating the operations of the circuits of FIGS. 1 and 2.

Utilization of the multiplexing pulses from the control circuit 6, of FIG. 3, eight time slots earlier than $T_{21}$, requires that clock 6 at time $T_{13}$, initiate the gain setting operation. A clear pulse 62 is applied by clock 6 to lead 32, FIG. 2, of the binary counter circuit 40. Reference to the column labeled Advance Pulses in FIG. 2A shows that this clear pulse 62 sets each of three stages, BGD1 through BGD3 of binary counter circuit 40 to a zero condition. Binary counter 40 is standard in the art, and responds to each advance pulse after its cleared condition so that the conductive conditions of the various stages sequentially advance by one for each advance pulse applied to the advance circuit 39 of binary counter 40.

As mentioned above, clear pulse 62 places each stage of binary counter 40 in a zero condition. Counter 40 has its outputs connected to a plurality of And gates 41 through 48, one for each binary gain setting possible. These And gates 41 through 48 in turn sequentially connect each branch of the ladder circuit 30 across the gain control terminals 49, 50 for amplifier 10 by controlling their companion gates 51 through 58. Thus, the zero conditions in stages BGD1 through BGD3 satisfy the input condition only for And gate 41. This gate 41, in turn, controls transmission gate 51 which is series-connected in ladder circuit 30 with the binary gain setting circuit 71. Circuit 71 is chosen with respect to gain conditions for amplifier 10 so as to reflect a binary gain value of 128 and may be any suitably chosen resistor or other current limiting device. Each of the remaining gates, such as 52 through 58 in ladder circuit 30 are also series-connected with other lower ordered binary gain values as determined by circuits 72 through 78. Gates 62 through 68 are non-conductive when gate 61 is conductive and thus only one binary gain setting value 71 at time $T_{13}$ is connected across the gain control terminals for amplifier 10. Although not all of the gates for the sequential connection of lower ordered binary gain settings are shown in FIG. 2, reference to FIG. 2A clearly defines the circuit operations that are necessary to selectively connect these other binary gain values to amplifier 10.

Assuming, for purposes of example, that the instantaneous amplitude of the analog input No. 1 at time $T_{13}$ has an amplitude such that when amplified at the highest gain value 128 the amplifier output is more than one-half volt. Thereafter, the following sequence for an automatic gain setting operation in amplifier gain control circuit 5 takes place. The amplified output signal exceeds the one-half volt comparison level in detector 21, and thus the Schmitt trigger circuit 22 is driven conductive and develops an output indication at And gate 27. Control circuit 6 at time $T_{14}$ applies a gain setting control pulse 64 of seven time slot duration via lead 28 to And gate 27. At lead 29, as shown by the dashed lines at pulse 64 of FIG. 3, the various control pulses from clock source 6 for the foregoing described multiplexer operation are present, and at time $T_{14}$, the input conditions for And gate 38 are satisfied and the first advance pulse AP1 of FIG. 3, is gated at time interval $T_{14}$, to the binary counter circuit 40.

This advance pulse AP1, as shown by the second row in FIG. 2A, simultaneously removes the binary gain setting 128 by disablement of gates 41 and 51 and connects the next lowest order binary gain value 64 across the gain control terminals for amplifier 10 by enablement of gates 42 and 52. In accordance with the foregoing assumption, this gain setting is still too high and at time $T_{15}$ advance pulse AP2 simultaneously removes the gain value 64 and establishes a gain value 32 across the gain control terminals 45, 50 of amplifier 10. The operation continues in this manner until at time $T_{17}$ advance pulse AP4 establishes in stages BGD1 through BGD3 of the binary counter 40 the binary conditions shown in row 5 of FIG. 2A. This operation connects the binary gain setting 8 across the gain control terminals of amplifier 10, and thereafter the amplified output monitored by detector 21 is less than the one-half volt required to maintain trigger circuit 22 in a conductive condition, and circuit 22 becomes non-conductive.

A non-conductive condition in trigger circuit 22 disables And gate 27 which in turn disables And gate 38. The value of binary gain setting at time of disablement will remain fixed for amplifier 10 until the binary counter circuit 40 is cleared for a subsequent gain operation at time $T'_{13}$ in the next succeeding time frame. During the time intervals $T_{18}$ through $T_{20}$ there will be no advance pulse delivered to binary counter 40, and thus the binary digits 001 remained stored respectively in BGD1 through BGD3. These digits represented the binary gain setting at which the analog sample was amplified and passed to the conversion circuitry time $T_{21}$.

Thereafter this binary gain setting signal and the binary data signal obtained by quantizing the analog sample 65, FIG. 3, for channel 1 at time $T_{21}$ are applied simultaneously to the format control circuit 12. The logic gates and timing operation of format control circuit 12 are not depicted in FIG. 2 but these principles are well known in data handling art and any of the well known format control circuits 12 may be utilized to obtain the combined signal applied to utilization circuit 15.

Figures 4, 5:
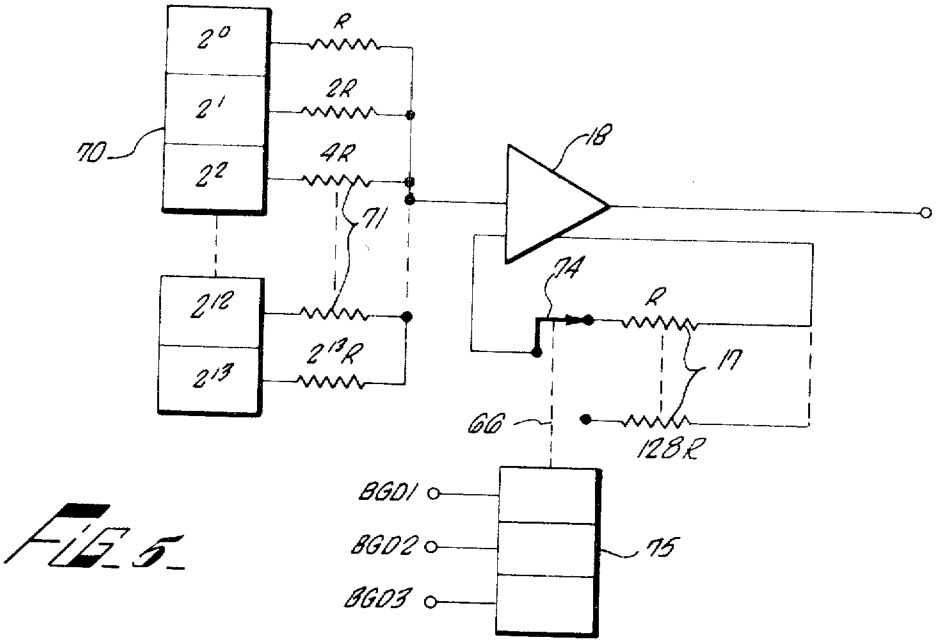
FIG. 4 is one possible tape format for both the binary coded gain setting information and the binary coded data sample information.
FIG. 5 is a binary gain amplifier connected prior to the output for the system of FIG. 1.

If the utilization circuit 15 includes a seven track magnetic tape such as shown in FIG. 4 as one possible format from many available tape formats, the two signals are in the form $V_1K_1$, where $V_1$ is the analog voltage and $K_1$ is the gain factor. $K_1$ is generated in binary form by the output signal from binary counter 40. $V_1$ is quantized by the analog-to-digital converter 8, and the digital word corresponding to $V_1K_1$ will be written on the magnetic tape by the format control circuit 14 in the manner shown in FIG. 4 for channel No. 1. Thus in track No. 1 the first signal written is an indication whether the analog voltage is plus or minus in polarity. Track No. 7 may be reserved for parity. The remaining space in track 1 and all of tracks 2 through 5 involve binary bit signals corresponding to $V_1K_1$. It should be noted that in track No. 6 two bits ID1 and ID2 are utilized for tape identification and other control functions which are necessary in well known computer operations.

In a similar manner, samples from the remaining channels 2 through 20 will be written along the magnetic tape in the manner shown in FIG. 4. It is obvious, of course, that the tape format described in connection with FIG. 4 is merely for purposes of example and various other tape formats are possible. For example, if it were desired to write this information on a 21 track tape, then all the binary signals representing the combined $V_1$, $K_1$ signals would be in parallel form in one channel across the width of the tape.

As mentioned hereinafter, it is often desirable to provide a quick-look check of the waveform in the analog value. This quick-look operation may be performed by the circuitry of FIG. 5. In FIG. 5 a portion of the digital-to-analog converter 16 of FIG. 1 is shown in more detail. This converter includes a plurality of gating circuits 70, one for each binary digit which represents the analog voltage $V_1$. Each of these gating circuits 70 are connected in series with a plurality of resistors 71 that are binary weighted according to the particular binary bit which they represent. All these resistors 71 are connected in common to the input terminal of an output amplifier 18, having a gain control circuit 17 which is identical to the gain control circuit shown in detail in FIG. 2.

However, for the sake of simplicity in FIG. 5 the output gain control circuit 17 is shown merely as a binary weighted potentiometer. This potentiometer includes a wiper arm 74, a switch select circuit 75 and a sequentially advancing stepping circuit 76 for moving wiper arm 74 sequentially through the various lower ordered binary resistors. The switch select circuit 75 has applied to its terminals the three binary bits representing $K_1$, or the gain factor. This switch select circuit 75 may be identical in construction and operation to the binary counter circuit 40 described in connection with FIG. 2.

Accordingly, the proper gain factor is chosen and connected across the gain control terminals for output amplifier 18. This selection of the proper input resistors synthesizes $V_1$, and the selection of the proper gain control resistors also synthesizes $K_1$ thus providing a reconstruction of the original analog sample.

It is to be understood that the foregoing features and principles of this invention are merely descriptive, and that many departures and variations thereof are possible by those skilled in the art, without departing from the spirit and scope of this invention.

What is claimed is:

1. An analog-to-digital conversion system comprising a source of analog signals, a variable gain amplifier having an input connected to said signal source, said amplifier having a gain control circuit with binary weighted gain settings, means for automatically selecting one of the binary weighted gain settings for the amplifier, means associated within the automatic gain selecting means for generating a digital character representative of the selected binary gain setting, means connected to an output of the amplifier for converting an analog signal amplified at the selected binary gain setting to a digital character representative of the amplitude of the amplified signal, and an output circuit commonly shared by the converter means and the automatic selecting means for combining both the digital character representing the amplified analog signal and the digital character representing the gain setting into a single digital word which represents the original non-amplified analog signal.

2. An analog-to-digital conversion system in accordance with claim 1 wherein each of said amplifiers comprises an operational analog signal amplifier having, in addition to an input and an output, a pair of gain control terminals, and wherein said automatic gain selecting means comprises a plurality of series circuits all connected in parallel across said gain control terminal pair, each of said series circuits comprising normally open gating means connected to a binary weighted gain control device, an advanceable binary counter connected to said gating means for individually closing as it advances each of said individual gating means in sequence beginning with the gating means series connected to the highest ordered binary weighted control device, a source of clock pulses for sequentially advancing the binary counter, a comparison level detector having a predetermined voltage level connected to said amplifier signal output terminal, and logic means controlled by said level detector and connected between the clock pulse source and the binary counter for inhibiting passage of said clock pulses to said binary counter when the amplifier output is less than said predetermined voltage level.

3. An analog-to-digital conversion system in accordance with claim 1 wherein the means associated with the automatic gain selecting means for generating a digital character is a binary counter that selects the binary weighted gain settings of the amplifier.

4. A pulse code modulation system having an improved dynamic range comprising a plurality of channels of analog signal sources of varying amplitudes, an analog-to-digital converter for converting a data sample from each analog channel to a digital signal of a predetermined number of data digital bits, an amplifier for each analog channel connected between the analog signal source and said converter, a gain control circuit for each amplifier, each gain control circuit having binary weighted gain control settings, means operable to selectively choose one of said binary gain control settings prior to the sampling time for that amplifier, a comparison device individual for each amplifier having a predetermined voltage level determined by the signal range of the analog-to-digital converter, said comparison device being connected between the output of the amplifier and said gain selecting means for rendering the selecting means inoperatvie when the lowest order binary setting capable of providing amplified signals within the signal range for the converter is connected to the amplifier, means for generating a digital signal of a predetermined number of bits representing said selected binary gain setting, a utilization circuit, and an information format circuit connected between the utilization circuit and in common with the converter circuit and the digital gain setting signal generator for combining digital signals from both into one binary signal representing the non-amplified signal for that data sample.

5. A data handling system comprising an analog-to-digital converter, a source of analog input signals having information content represented by a varying range of amplitude levels which are greater than the input amplitude range capability of the analog-to-digital converter, means for amplifying said input signals in accordance with a plurality of selectively available binary weighted gain settings, means connected to said amplifying means and selectively operable for establishing the lowest order binary gain setting available which provides an amplified signal output within the range capability of the analog-to-digital converter, first generating means connected to said gain establishing means for developing a binary signal indicative of said established gain setting, second generating means including said analog-to-digital converter for generating a binary signal indicative of the amplitude of said amplified signal, and means common to said first and second generating means for combining said signals therefrom into a binary signal indicative of the amplitude of said non-amplified input signal.

6. A data handling system in accordance with claim 5 and further comprising a utilization circuit connected to said signal combining means for processing said combined signal in digital form, output amplifying means identical to said input amplifying means for reconstructing in analog form said original non-amplified input signal from said combined digital signal, means connected between said utilization circuit and said output amplifying means for recovering said combined digital signal from said utilization circuit and for applying it to said output amplifying means.

7. A data handling system in accordance with claim 6 and further comprising a visual display device for displaying analog waveforms, and means connecting said visual display device to said output amplifier for producing a visual record of said reconstructed non-amplified input signal.

8. A digital data acquisition system comprising a plurality of analog data signal sources; a multiplexing unit; a first plurality of amplifiers, one for each analog signal source, each amplifier having its input connected to a single analog signal source and its output connected to the multiplexing unit; a first plurality of gain control circuits one each associated with each of said input amplifiers and having selectively available binary weighted gain control settings for said amplifier; time control means for defining successive, repetitive data sampling intervals, one interval for each of said analog data sources, and for additionally defining an equal number of successive repetitive gain setting intervals a time increment prior to said data sampling intervals; first means connecting said time control means to said multiplexing unit for sampling in turn each one of said sources; and second means connecting said time control means to said amplifiers for establishing the proper binary weighted gain setting in said amplifier during said time increment prior to said data sampling interval for that source.

9. A digital data acquisition system in accordance with claim 8 wherein said plurality of analog data signal sources comprises a plurality of geophones for recovering seismic shock waves and for converting such waves into equivalent electrical analog signals, and further comprises means connecting one geophone individually to one amplifier of said plurality of amplifiers.

10. A digital data acquisition system in accordance with claim 9 and further comprising means connected to said multiplexer for converting each amplified sample from said geophones to a first binary coded digital signal; and wherein said second connecting means comprises a binary counter for storing a second binary coded digital signal representing the binary weighted gain setting at which each sample was amplified.

11. A digital data acquisition system in accordance with claim 10 and further comprising a magnetic recording medium; and a format control circuit connected between said first and second connecting means for storing on the medium sequential blocks of data including said first and second digital signals as a single signal representing one non-amplified signal sample.

12. A digital data acquisition system in accordance with claim 11 and further comprising a demultiplexing unit connected to said recording medium for recovering in sequence the first binary coded signals from said data blocks representing said amplified samples from said geophones; means connected to said demultiplexing unit for synthesizing into an analog value each of said first digital signals from each of said data blocks; a second plurality of amplifiers identical to said first plurality of amplifiers; means connecting the amplifiers of said second plurality one each for the data blocks of each analog signal source to said digital to analog synthesizing means; a second plurality of gain control circuits one each associated with each of said output amplifiers; signal recovery and applying means for recovering in sequence said second binary coded digital gain setting signals from each data block and for applying each recovered signal to the one of said plurality of gain control circuits simultaneously with the synthesizing operation of the first signal of that data block by its associated output amplifier.

13. A digital data acquisition system as defined in claim 12 and further comprising a visual display device for visually recording analog waveforms; and means connecting said output amplifiers to said visual display device to record one analog seismic signal trace for each one of said geophone inputs.

14. An analog-to-digital conversion system comprising: a source of analog signals having a wide amplitude range, a variable gain amplifier having binary weighted gain settings, means for coupling the signals from the source to the amplifier, an analog-to-digital converter, means for reducing the gain setting of the amplifier in decreasing binary weighted values until the amplified output signal falls below a predetermined limit that represents the allowable range for the input scale of the analog-to-digital converter, means for applying the output of the amplifier to the analog-to-digital converter, means for generating a binary-coded signal representative of the gain setting of the amplifier, and means for combining the binary-coded signal with the output of the analog-to-digital converter in a single word representative of the amplitude of the analog signal.

15. The analog-to-digital system of claim 14, in which means are provided for separating the single word into a first digital character representing the data sample from the source and a second digital character representing the gain setting of the amplifier, a variable gain output amplifier is provided having binary weighted gain settings, means are provided for reducing the gain setting of the output amplifier in decreasing binary weighted values to the gain setting designated by the second character, means are provided for converting the first character to an analog signal, means are provided for applying the converted analog signal to the output amplifier, and means are provided for recording on a visual display device an analog wave form representing the amplitude of the signal produced by the output amplifier.

References Cited

UNITED STATES PATENTS

| | | | |
|---|---|---|---|
| 3,308,392 | 3/1967 | McCarter | 340—15.5 |
| 3,299,421 | 1/1967 | Neitzel | 340—347 |
| 3,283,320 | 11/1966 | Blachowicz | 340—347 |
| 3,239,802 | 3/1966 | Sheffet | 340—15.5 |
| 3,156,899 | 11/1964 | Reich et al. | 340—172.5 |

ROBERT C. BAILEY, *Primary Examiner.*

G. D. SHAW, *Assistant Examiner.*